July 16, 1929.   R. L. SKINNER   1,721,321
THERMOSTATIC APPLIANCE
Filed May 26, 1928

Inventor:
Ralph L. Skinner
By Walter M. Fuller
Atty

Patented July 16, 1929.

1,721,321

UNITED STATES PATENT OFFICE.

RALPH L. SKINNER, OF DETROIT, MICHIGAN, ASSIGNOR TO SKINNER AUTOMOTIVE DEVICE CO., INC., OF DETROIT, MICHIGAN, A CORPORATION OF CALIFORNIA.

THERMOSTATIC APPLIANCE.

Application filed May 26, 1928. Serial No. 280,737.

My invention pertains to thermostats, for example, those used to control or govern the opening and closing of valves, although the new structure is in no way limited to any specific employment.

One of the leading aims or purposes of the invention is the provision of a thermostat which will be highly sensitive to temperature changes, which will have substantial movement and unusual power for its size, and which will be relatively small and compact so that it may be satisfactorily employed in installations affording small space.

In an ordinary, duplex-metal thermostatic bar, the power thereof may be increased by using a bar of greater thickness or one of shorter length, but such change decreases its sensitivity to temperature variations, and the thermostat of this appliance requires both power and great sensitiveness.

Accordingly, the power of the new thermostat is made great by employing a plurality of short, thin, bi-metal strips associated together in series relation to obtain the cumulative effect of the plurality, the short length of the strips affording compactness of structure and power, the thinness insuring a high degree of sensitiveness, and the series relation of the strips multiplying the motion as required.

To enable those acquainted with this art to fully understand the invention, both from structural and functional standpoints, in the accompanying drawing forming a part of this specification, I have illustrated in detail, a present, preferred embodiment of the invention, and, for simplicity, like reference numerals have been employed for the same parts throughout the several views.

Figure 1:
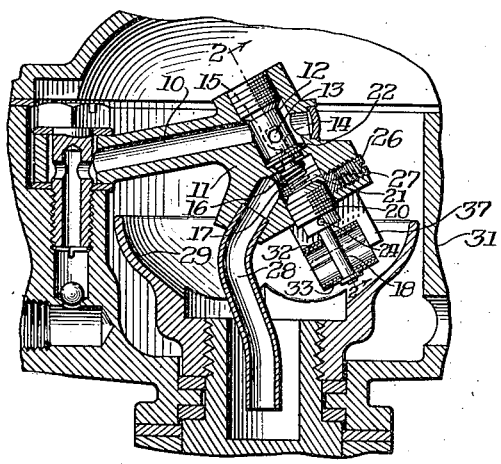
Figure 1 is a vertical section through an appliance incorporating the new thermostatic structure.

Referring to this drawing, the new and improved thermostatic structure has been shown in association with, and controlling the action of, an oil rectifier or distillator, such as is employed with an internal-combustion engine to reclaim its contaminated lubricant under the action of heat and desirably also under sub-atmospheric pressure.

The impure oil to be purified by the driving off of its volatile or gasifiable polluting constituents by heat is fed under pressure through a conduit 10 in a casting 11 of irregular shape into an inclined, hollow screw 12 by means of a cross-hole 13 of the latter communicating with its longitudinal, central passage or port 14, the wall margin around the lower end of which forms a valve-seat for a conical-valve 15 having an external, circular shoulder 16 against which one end of a coiled spring 17 encircling the stem or shank 18 of the valve bears, the opposite end of the spring pressing against an inner shoulder 19 of a hollow, adjustment screw 20 threaded into a cavity 21 of the specified casting 11.

Screw 12 may be readily removed for cleaning or replacement purposes and to assure that such screw, or its substitute, will always occupy the same position, thus not disturbing the adjustment of the valve which cooperates with it, the reduced-diameter, unthreaded part of the screw is provided with an external, circular rib 22 the under face or shoulder of which, when the screw is fully home, bears on the companion surface of an internal, annular rib 23 in the casting 11 between the chambers 10 and 21, communication between which is governed by the valve.

Adjustment of the spring is easily effected by turning the abutment screw 20 by means of an appropriate tool or wrench applied in any one or more of its cross recesses 24, 24, which are provided specifically for that purpose, the screw, when once correctly set, being locked in such relation by a set-screw 26 and a lead plug 27 between the two screws to prevent injury to the thread of screw 20.

Chamber or compartment 21 is equipped with a drain-pipe 28 which allows the oil flowing down through the open valve to be delivered into a heated vessel 29 within an outer shell or casing 31, the heated oil overflowing from such container or receptacle which is always full.

Valve-stem 18 extends down through the central opening in screw 20 through which it may slide during the valve opening and closing movements, the downwardly-protruding portion of such stem extending through registering, center apertures in a pair of reversely-curved, bi-metal, thermostatic elements 32 and 33, each composed of a pair of united, metal strips of substantially different co-efficients of expansion, such thermostatic members being constantly immersed in the oil in the continuously-filled oil-vessel and hence always subject to the temperature of such body of oil.

Figure 2:
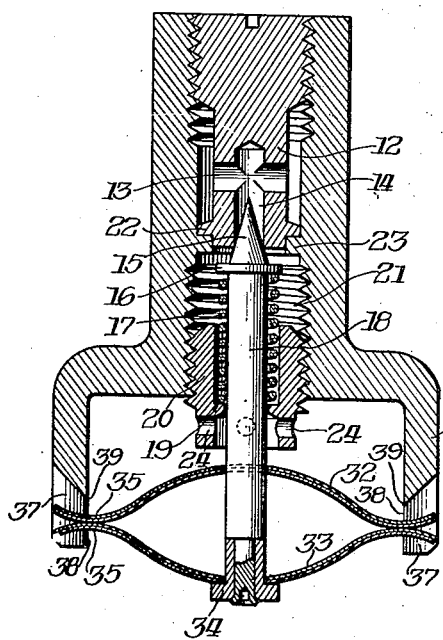
Figure 2 is an enlarged section on line 2—2 of Figure 1.
Figure 3:
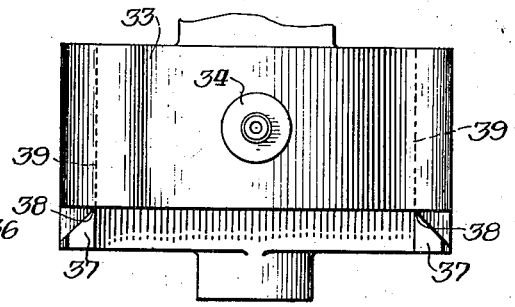
Figure 3 is an enlarged end view of the thermostat.

Valve-stem 18 at its lower end has an enlargement or shoulder 34 below, and co-operating with, the thermostatic-member 33, and, in this connection, it should be observed that after the valve has closed under the action of its spring, such operation being permitted by the contraction of the multiple thermostat, the latter may contract still more, as shown in Figure 2, without influencing the valve and without detrimental effect on the thermostat, such as subjecting it to additional strain which would have a tendency to give it a permanent set.

The spring is strong enough to close the valve against the maximum substantially-fluctuating oil-pressure in the conduit 10, and the thermostat, when it opens the valve by its expansion, does so in opposition to the closing tendency of the spring.

Stated differently, the thermostat opens the valve against the spring action, and the spring closes the valve when permitted to do so by the thermostat.

In order to have the thermostat operate to best advantage, it should be substantially frictionless, and, accordingly, the end sections of each duplex-metal bar are reversely curved or rounded somewhat at 35, so that the two elements have rocking bearings on one another at their ends eliminating practically all friction at such points.

To hold the two thermostatic-elements in proper relation to one another at all times, and with a minimum of friction, the lower part of casting 11 is formed as a yoke 36, the arms of which have extensions 37, 37 above the heat-responsive elements 32, 33, with knife-edges 38, 38 co-acting with the upper edges of the parts 32, 33, thus preventing their rotation or turning about the axis of the valve-stem on which they are mounted, but, at the same time, permitting them to move axially of such stem with very small resistance owing to the knife-edge contact.

To assure that such thermostatic-members will not become unduly canted on the valve-stem, the ends of the yoke arms are also constituted as knife-edges 39, 39, designed, if occasion requires, to contact with the adjacent member 32 and to prevent the pair from assuming an undue angular relation to the valve-stem in their own plane.

The friction due to such contact is, of course, small in amount, so that the entire mounting of the double thermostat may be said to be practically or substantially frictionless.

As the temperature of the oil in the vessel increases and transmits such heat to the immersed thermostat, the bi-metal or duplex bar 32 arches more inwardly toward the valve and the correlated bar 33 arches in the opposite direction, the ends of the bars rocking on one another at 35, 35 as may be required.

After such combined or conjoint bending has taken up the play or looseness of the thermostat between the end of screw 20 and the valve-stem head 34, further bending of the members, due to the increased heat, will cause the valve to open against, or in opposition to, the valve-closing tendency of the spring.

After the duplex or multiple thermostat has contracted sufficiently upon decrease of oil temperature, it allows the spring to close the valve against the oil pressure in the line, and, thereafter, as the temperature further decreases, the thermostat may contract still more without putting a set in it or otherwise adversely affecting it.

Although in this instance, the multiple thermostat has been shown as operating a valve, obviously it may be used to actuate any other member, and although in the drawing only one pair of thermostatic-members has been shown, it will be apparent that as many of such elements may be used as is required to meet the particular situation.

Those acquainted with this art will readily understand that the invention, as defined by the appended claims, is not limited or restricted to the precise and exact details of structure shown and described, and that these may be modified within comparatively wide or radical limits without departure from the heart and essence of the invention and without the loss of any of its substantial benefits and advantages.

I claim:

1. In a multiple thermostatic appliance, the combination of a pair of reversely-bowed bi-metal thermostatic-members having reversely-rounded end portions adapted to bear on one another without substantial friction, each of said members being composed of two metal strips of different co-efficients of expansion, an abutment against which the middle portion of one of said members may bear, means actuated by said members operatively associated with the middle portion of said other thermostatic-member, spring-means acting on said actuated means in opposition to, but incapable of overpowering, the joint expanding action of said members, anti-friction knife-edge means co-acting with said thermostatic-members to prevent them from turning about an axis through their centers, and anti-friction knife-edge means to prevent said thermostatic-members from canting substantially in their own plane.

2. In a multiple thermostatic appliance, the combination of a pair of reversely-bowed bi-metal thermostatic-members having reversely-rounded end portions adapted to bear on one another without substantial friction, each of said members being composed of two metal strips of different co-efficients of expansion, an abutment against which the middle portion of one of said members may bear, means actuated by said members operatively associated with the middle portion of said other thermostatic-member, spring-means acting on said actuated means in opposition to, but incapable of overpowering, the joint expanding action of said members, and anti-friction knife-edge means coacting with said thermostatic-members to prevent them from turning about an axis through their centers.

3. In a multiple thermostatic appliance, the combination of a pair of reversely-bowed bimetal thermostatic-members having reversely-rounded end portions adapted to bear on one another without substantial friction, each of said members being composed of two metal strips of different co-efficients of expansion, an abutment against which the middle portion of one of said members may bear, means actuated by said members operatively associated with the middle portion of said other thermostatic-member, spring-means acting on said actuated means in opposition to, but incapable of overpowering, the joint expanding action of said members, and anti-friction knife-edge means to prevent said thermostatic-members from canting substantially in their own plane.

In witness whereof I have hereunto set my hand.

RALPH L. SKINNER.